United States Patent [19]

Gammon

[11] 4,065,392
[45] Dec. 27, 1977

[54] FILTER

[76] Inventor: Howard M. Gammon, 500 Brielle Road, Manasquan, N.J. 08736

[21] Appl. No.: 698,511

[22] Filed: June 22, 1976

[51] Int. Cl.² ............................................. B01D 27/02
[52] U.S. Cl. .................................... 210/282; 210/284; 210/323 T
[58] Field of Search ................... 55/387, 498; 210/41, 210/282, 323 T, 437, 457, 484, 497 R, 502, 283, 284, 287, 289

[56] References Cited

U.S. PATENT DOCUMENTS

| | | | |
|---|---|---|---|
| 2,904,186 | 9/1959 | Moore | 210/437 |
| 3,019,904 | 2/1962 | Stecher | 210/484 |
| 3,225,932 | 12/1965 | Dunn et al. | 210/457 |
| 3,470,104 | 9/1969 | Domas | 210/502 |
| 3,552,553 | 1/1971 | Reading | 210/484 |
| 3,799,352 | 3/1974 | McClive | 210/282 |
| 3,836,005 | 9/1974 | Bauer | 210/282 |

Primary Examiner—Thomas G. Wyse
Assistant Examiner—Ivars Cintins
Attorney, Agent, or Firm—Charles F. Gunderson

[57] ABSTRACT

Filters for treatment of jet fuels and light hydrocarbons include clay filter material to remove surfactants and other contaminants. One of the most common systems has a series of replaceable filter elements, each in the form of an elongated annulus, about 7 inches in diameter and about 18 inches long, where the fluids flow from outside to inside through the clay filter material. These fiter elements are stacked with one or more in series on a common collector tube for the filtered fluids. The unfiltered fluids are applied to the outside of the stacks of bags, and the filtered fluids are drawn out of the common collector.

5 Claims, 3 Drawing Figures

FILTER

BACKGROUND OF THE INVENTION

Contamination of jet fuels is often caused by surfactants that may come from the refining process and treatment, or from residue in pipelines or carriers as well as from cleaning and maintenance materials. The problems that are attributed to surfactants are principally related to their tendency to prevent the filter separator from performing its function, i.e., removing dirt and water from the fuel. The results of this are extensive. Water and dirt in an aircraft fuel system have well recognized dangers, but secondary effects are of equal importance. Bacteria can grow in the aircraft fuel system if water is present and the result can be corrosion of structural members and errors in the signals from fuel quantity gaging probes.

Treatment of fuel to remove surfactants is usually done with attapulgus clay. For best results with the clay treatment, it is essential to keep the fuel in contact with the clay for as long a time as possible. This is called residence time and is required because the fuel must have enough time to penetrate the clay particles where the surfactants and small dirt particles, in the submicronic range, can be adsorbed onto the microscopic surfaces of the crystals.

In the refinery, large towers are built to contain many tons of bulk clay in a percolation column. However, complications of handling bulk clay outside of a refinery have led the industry to use stacks of clay filter elements in a filter vessel when it is necessary to treat the fuel in field installations.

These conventional filter vessels use one or more of the replaceable filter elements stacked end to end on each of a series of outlet pipes. The liquid enters the filter vessel to pass through the filter elements radially to reach the outlet pipes. Flat plates, at the ends of each stack, press the filter elements together to seal the ends and the junctions between the elements.

Two types of clay filter elements are available. One is a bag element which contains a given quantity of clay inside an annular cloth bag. The other is a canister-type filter element in a rigid container, which contains the same clay but maintains its shape better. The canister-type element is several times more expensive than the bag element and it is more difficult to transport without damage, but it provides a more effective seal between the elements when they are stacked on top of one another in the standard filter vessels. The rigid ends can be equipped with gaskets to seal tightly and cut down on the by-passing of fluids, that may occur in bag-type elements because of the inevitable folds of the cloth in the adjacent ends of the bag elements. Since the rate of flow of the fluids through the clay elements is quite low, it is possible to have a significant amount of by-passing of fluids from relatively small creases or apertures between the bag elements.

Bag-type elements have the additional problems of being relatively amorphous, and having seams between the material of the inner, tubular portion, the outer tubular portion, and any end pieces that are provided. Such seams increase the possibility of poor sealing and by-passing of fluids, besides requiring additional sewing steps in the manufacture. The last sewing operation is particularly time consuming and must be made under difficult conditions, with the clay under the top of the filled element impeding the sewing operation and precluding a tight packing of the clay under the seams. Also the final seams cannot be internal, and raw edges must be exposed, which, again, increases the possibility of by-passing of fluids.

It is therefore an object of this invention to provide a bag-type filter element that is relatively easier, faster, and more economical to construct; that can be stacked in standard filter vessels; that is readily replaceable and disposable; and that virtually eliminates the by-passing caused by the folds and radial creasing that tends to develop at the ends of conventional bag-type filters.

SUMMARY OF THE INVENTION

A liquid filter has a series of annular cloth bags each having an outer cloth sleeve surrounding an inner felt tube, and having the top end sealed. Each bag is filled with an attapulgite clay that may be tamped down. The bottom or lower end of the inner felt tube is slitted at intervals and folded out, the bottom of the outer cloth sleeve is folded in, and the bottom of the unit is molded in a plastic end piece to seal the clay within the unit and effect a closure. The end piece includes a projecting bead or ridge that provides an annular seal when it is stacked against the top end of the lower unit of the filter.

BRIEF DESCRIPTION OF THE PREFERRED EMBODIMENT

Figure 1:
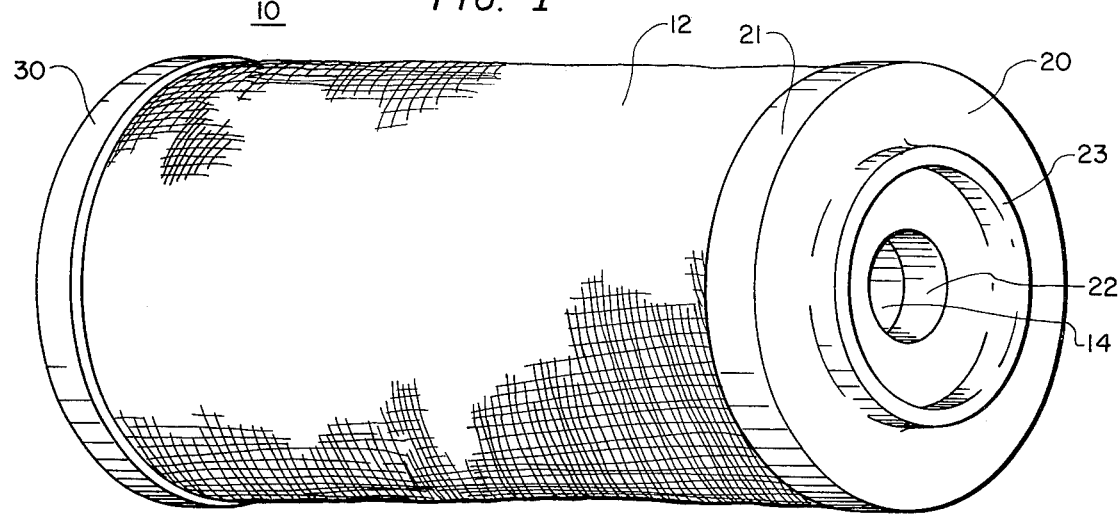
FIG. 1 shows an isometric view of the filter element.

In FIG. 1 the filter element 10 is seen with its outer body or sleeve 12, and a center tube 14 joined at one end by an end piece or cap 20. The cap has an outer lip 21 joining the outer body or sleeve, and an inner lip 22 joining the center tube 14. A continuous, concentric bead 23 projects from the surface of the end piece.

Figure 2:
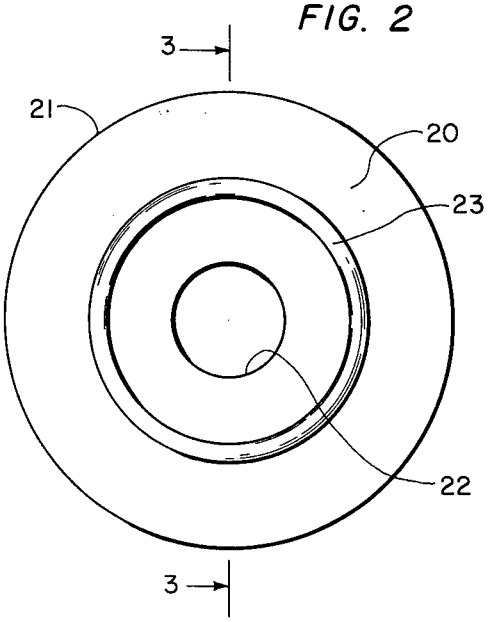
FIG. 2 is an end view of the lower face of the element.

FIG. 2 shows a top or plan view of the same end piece 20 with the same elements similarly numbered.

Figure 3:
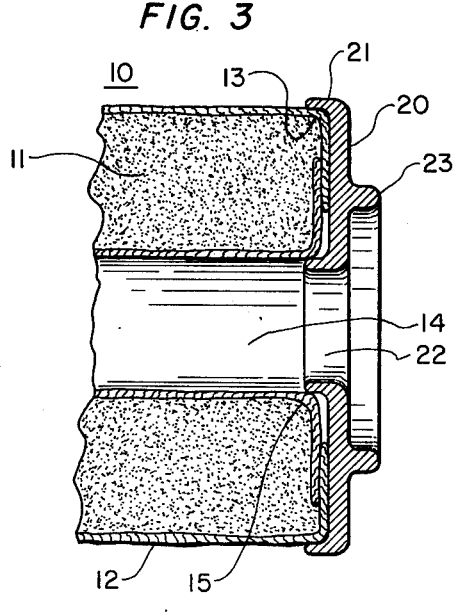
FIG. 3 shows a cross section of the lower end.

FIG. 3 shows a cross section of a portion of the end of the filter element 10 and the end piece 20 along the lines 3—3 of FIG. 2.

This figure clearly shows the outer body or sleeve 12 and the center tube 14 enclosing the filter clay 11. The outward fold 15 of the center tube, and the inward fold 13 of the outer sleeve are also seen, joined and covered by the end piece 20. The extent of the outer lip 21, and the inner lip 22, are suggested, as well as a typical shape and position for the bead 23.

In operation, this filter element is part of a stack of elements that are combined, in series, along a common tube, not shown, as part of a well known type of filter for jet fuels and light hydrocarbons. In construction, the preformed bag may have one end pre-sewn so that the space between the outer sleeve and the center tube can be filled with a filtering material, which is, ideally, a clay of the attapulgite or attapulgus type. Because of the construction and sealing technique used here, the filter clay can be packed or tamped down for maximum density and effectiveness.

The center tube 14 may be a felt-type material, whose upper end is sewn or sealed to the upper end of the outer sleeve by using an annular piece of cloth fitted between the center tube and outer sleeve. The lower end of the center tube includes an extension that can have several uniform slits made down to the level of the filter clay to produce a series of tabs or flaps 15 that can be folded outwardly, as seen in FIG. 3, to partially cover the clay. The outer sleeve 12 may be a fairly heavy, porous material, either woven or non-woven. The lower end of this sleeve also includes an extension 13 that can be folded inwardly, as seen in FIG. 3, that may complete the sealing of the lower end to contain the filter clay so that the unit can be turned over for the final operation.

Instead of the usual sewing process for sealing the bottom of the filter bag with creasable material that causes the leaking or by-passing of fluids around the ends, a mold, not shown, is filled with a predetermined amount of plastisol and is then fitted over the bottom of the bag, and the whole unit is turned upside down. The plastisol soaks into the felt of the porous center tube and into the fabric of the outer sleeve to completely seal the lower end and form the end piece 20 as seen in the drawings. The plastisol is then cured under heat and solidified to bond everything together. The mold includes at least one continuous bead or ridge 23 that projects from the surface of the end piece.

When units such as these are stacked on top of one another in a conventional filter vessel, the soft, cloth top of one unit presses tightly against the molded end piece 20 of the adjacent unit to form a tight bond with the bead 23 further imbedding itself into the top cloth, and the soft clay under it, to form a relatively tight seal against radial seepage and by-pass of the fluids between adjacent elements. A flat metal seal at the top of each stack in a conventional filter vessel will also form a tight seal against the cloth top end piece by machining a similarly shaped bead as 23.

While only one end piece may be necessary, since the bead 23 will sink into the soft cloth and clay of the end of the adjoining element, it is effective but not essential to provide a second end piece, such as 30 on the opposing end. This is not shown in detail but it would, obviously, be a mirror image of the end piece 20, with a groove to match and accommodate the bead 23, as well as any other variations in its surface necessary to conform to corresponding variations in the opposing end piece. Such an end piece at 30 could be formed of the same type of plastic as the end piece 20, for the most effective seal.

The plastisol described here is commercially available and is quite effective for this purpose. It is available as a liquid that can be poured into the mold to cover the entire bottom end, and will soak into the felt and fabric of the inner tube and outer sleeve. It can then be cured or hardened by heat in a well known manner. However, there are many other types of plastics that would be equally effective, that are also curable by heat, or by other means. The essential feature is that the plastic must bond to the cloth to form a tight seal and must be impervious and resistant to any of the liquids being filtered.

The attapulgus clay mentioned earlier is highly adsorbant and is used at about a 60-90 mesh size. It is ideally suited for this purpose, since it is formed of microscopic, needle-like attapulgite crystals that provide an enormous effective surface area. For example, it is computed that one pound of attapulgite may have 13 acres of surface area. However, other types of filter material such as bauxite are available and may be used here, in the same manner, and other types of material may be developed or discovered that may also be applicable for this filter.

The conventional filter vessels for which this new element is intended are commonly used for aircraft fuels and the like. However, it will be apparent that this bag-type element structure and filtering technique may be effective for other types of liquid with the same or other appropriate filtering materials.

The end piece 20, illustrated in the preferred embodiment, shows only one bead or ridge 23 to imbed into the soft fabric and clay of the top of the adjoining element to provide the radial seal. However it will be obvious that any number of ridges or beads of a similar cross section, or any other suitable cross section, may be used to improve the contact between filter elements and the sealing characteristics of the junction. The shape of the beads or ridges may be dictated to some extent by the ability of the cloth to conform to the shape of the ridge. The beads would normally be continuous, for radial sealing, and, presumably, concentric with the rest of the end piece. If an opposing molded end piece is provided at 30, it should include grooves or channels or ridges, as noted earlier, to conform with any and all of the beads, ridges and channels of the corresponding configuration of the end piece 20.

The materials of the center tube and the outer sleeve may be of any well known types that can hold the necessary shape and contain the filtering material. The material of the inner, center tube must be of a fine structure to prevent release of clay dust to the downstream side. This felt or fabric tube is fitted with a disposable cardboard tube during manufacture. When the element is installed on the screen-covered collector tube, the cardboard tube is automatically ejected. The material of the outer sleeve must also be fine enough to contain the clay, but porous enough to pass the fluids to be filtered. However, since the sleeve is upstream in the filter, it is not as critical as the center tube. It should be noted that all of the sewn edges in this construction can be turned in to produce a neater, more effective package with no external raw seams.

What is claimed is:

1. A liquid filter element for use in stacks comprising an inner tubular center portion formed of a material permeable to said liquid;
   an outer tubular sleeve portion formed of a material permeable to said liquid;
   a first means for sealing the space between said inner tubular portion and said outer tubular portion at one end of said filter element;
   a filtering material filling the space between said inner and said outer tubular portions;
   said inner tubular center portion having tabs extending beyond the other end of said filter element, said tabs being folded outwardly over said filtering material;
   said outer tubular sleeve portion having material extending beyond said other end of said filter element, said material being folded inwardly over said filtering material;
   a second means for sealing the space between said inner tubular portion and said outer tubular portion at said other end of said filter element;
   said second means comprising an impervious material impregnating said tabs of said inner tubular portion extending beyond said other end of said filter element and impregnating said material of said outer tubular portion extending beyond said other end of said filter element, and being molded to form a continuous seal between said material of said outer tubular sleeve portion and said material of said inner tubular center portion;

at least one continuous annular ridge in said second means extending above the surface of said impervious material and situated between said inner and said outer tubular portions and said second means of one of said filter elements being seated against a first means of another of said filter elements, whereby said annular ridge of said second means of said one filter element will embed itself into said first means of said other filter element, to avoid by-pass of said liquid around said filter element.

2. A liquid filter element as in claim 1 wherein said inner tubular center portion is formed of a liquid-permiable felt.

3. A liquid filter element as in claim 1 wherein said outer tubular sleeve portion is formed of a woven cloth.

4. A liquid filter element as in claim 1 wherein said filtering material is an attapulgite clay.

5. A liquid filter element as in claim 1 wherein said second means is molded in place at said other end of said filter element to seal said filtering material within said filter.

* * * * *